(12) United States Patent
West et al.

(10) Patent No.: US 7,137,562 B2
(45) Date of Patent: Nov. 21, 2006

(54) ELEVATED DATA CARD READER

(75) Inventors: David Owen West, San Diego, CA (US); Kenneth Weselake, Unterhaching (DE); Isaac Ward, Queenscliff (AU); Souhail Abood, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 657 days.

(21) Appl. No.: 10/235,345

(22) Filed: Sep. 5, 2002

(65) Prior Publication Data
US 2004/0204090 A1    Oct. 14, 2004

(51) Int. Cl.
*G06K 7/00* (2006.01)

(52) U.S. Cl. ............... 235/486; 235/439; 235/483; 235/441; 235/492

(58) Field of Classification Search ........... 235/439, 235/486, 483, 441, 492, 440; 439/331, 73, 439/326
See application file for complete search history.

(56) References Cited

U.S. PATENT DOCUMENTS

| | | | | |
|---|---|---|---|---|
| 4,743,746 A | * | 5/1988 | Murschall et al. | 235/486 |
| 5,257,414 A | * | 10/1993 | Trahan et al. | 455/558 |
| 5,718,609 A | * | 2/1998 | Braun et al. | 439/630 |
| 5,726,432 A | * | 3/1998 | Reichardt | 235/441 |
| 5,778,321 A | * | 7/1998 | Jouin et al. | 455/558 |
| 5,831,256 A | * | 11/1998 | De Larminat et al. | 235/486 |
| 5,894,597 A | * | 4/1999 | Schwartz et al. | 455/558 |
| 5,936,222 A | * | 8/1999 | Korsunsky et al. | 235/441 |
| 5,949,048 A | * | 9/1999 | Nakamura et al. | 235/439 |
| 5,997,356 A | * | 12/1999 | Chang | 439/630 |
| 6,021,945 A | * | 2/2000 | Hoolhorst | 235/441 |
| 6,099,337 A | * | 8/2000 | Chan | 439/326 |
| 6,126,464 A | * | 10/2000 | Chang | 439/188 |
| 6,174,188 B1 | * | 1/2001 | Martucci | 439/326 |
| 6,334,786 B1 | * | 1/2002 | Lee | 439/331 |
| 6,808,396 B1 | * | 10/2004 | Kawaguchi et al. | 439/76.1 |

* cited by examiner

*Primary Examiner*—Kimberly D. Nguyen

(57) ABSTRACT

A circuit board mounted data card reader includes an elevated card receiving assembly for receiving a data card such as a SIM card, UIM card, or the like, and a support assembly. The card receiving assembly is elevated or spaced away from the circuit board by the support assembly for conserving space on the circuit board and allowing other components to be mounted to the circuit board beneath the data card reader.

30 Claims, 7 Drawing Sheets

ELEVATED DATA CARD READER

BACKGROUND OF THE INVENTION

The present invention relates generally to mobile telephones and like wireless communication enabled electronic devices employing data cards such as SIM cards, UIM cards, or the like, and more particularly, to an elevated data card reader for receiving a data card in such devices.

Many mobile telephones employ small removable smart cards or "data cards" to provide secure user authentication, secure roaming, and a platform for value-added services in wireless communications. Typically, such data cards comprise a small plastic card containing an integrated circuit that provides the card with a limited amount of memory and/or processing capability. Presently, data cards are used mainly in the Global System for Mobile Communications (GSM) standard in the form of a SIM (subscriber identification module) card. However, data cards can also be used to customize mobile telephones employing other air interface standards (e.g., personal communications service (PCS), satellite, digital cellular system (DCS), and the like). Moreover, new wireless network specifications currently being developed typically require mobile telephones utilizing data cards (e.g., a user identification module (UIM) card), performing functions similar to SIM cards.

In use, data cards (e.g., SIM cards, UIM cards, and the like) are inserted into a data card reader contained in the mobile telephone so that data may be read from or written to the card. Presently such data card readers are mounted directly to the main circuit board within the mobile telephone. However, because mobile telephones are typically compact in size, electronic components must be densely spaced on the telephone's main circuit board. Thus, the data card reader, being a comparatively large component, occupies space on the circuit board that could be used to mount other electronic components. For example, FIG. 1 illustrates a typical surface mounted SIM card reader 100 mounted to the main printed circuit board (PCB) 102 of a mobile telephone. The SIM card reader 100 occupies an area 104 of the circuit board 102 of approximately 75.75 square millimeters (approximately 7.5 millimeters by 10.1 millimeters). If the SIM card reader 100 were removed from the circuit board 102, this area 104 could be used for mounting additional electronic components, or for locating such electronic components in a more efficient manner.

Consequently, it is desirable to provide a circuit board mounted data card reader having a card receiving assembly for receiving a data card such as a SIM card, UIM card, or the like, wherein the card receiving assembly is elevated or spaced away from the circuit board, conserving space on the circuit board and allowing other components to be mounted to the circuit board beneath the data card reader.

SUMMARY OF THE INVENTION

The present invention is directed to a circuit board mounted data card reader having a card receiving assembly for receiving a data card such as a SIM card, UIM card, or the like. The card receiving assembly is elevated or spaced away from the circuit board, conserving space on the circuit board and allowing other components to be mounted to the circuit board beneath the data card reader.

According to a specific embodiment, the present invention provides a data card reader comprising a card receiving assembly for receiving a data card and a support assembly for coupling the card receiving assembly to a circuit board. The support assembly spaces the card receiving assembly away from the circuit board for allowing a component to be mounted to the circuit board beneath the card receiving assembly. The data card reader may further include a shield for shielding a data card received in the card receiving assembly from a component mounted to the circuit board beneath the card receiving assembly.

According to a second specific embodiment, the present invention provides a circuit board assembly comprising a circuit board and a data card reader mounted to the circuit board. The data card reader includes a card receiving assembly for receiving a data card and a support assembly for coupling the card receiving assembly to the circuit board. The support assembly spaces the card receiving assembly away from the circuit board allowing a component to be mounted to the circuit board beneath the card receiving assembly. The circuit board assembly may further include a shield for shielding a data card received in the card receiving assembly from a component mounted to the circuit board beneath the card receiving assembly.

According to a third specific embodiment, the present invention provides a mobile telephone comprising a circuit board and a data card reader mounted to the circuit board. The data card reader includes a card receiving assembly for receiving a data card and a support assembly for coupling the card receiving assembly to the circuit board. The support assembly spaces the card receiving assembly away from the circuit board allowing a component to be mounted to the circuit board beneath the card receiving assembly. The mobile telephone may further include a shield mounted to the circuit board for shielding a data card received in the card receiving assembly from a component mounted to the circuit board beneath the card receiving assembly.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

DETAILED DESCRIPTION OF SPECIFIC EMBODIMENTS

Reference will now be made in detail to the presently preferred embodiments of the invention, examples of which are illustrated in the accompanying drawings.

Figure 1:
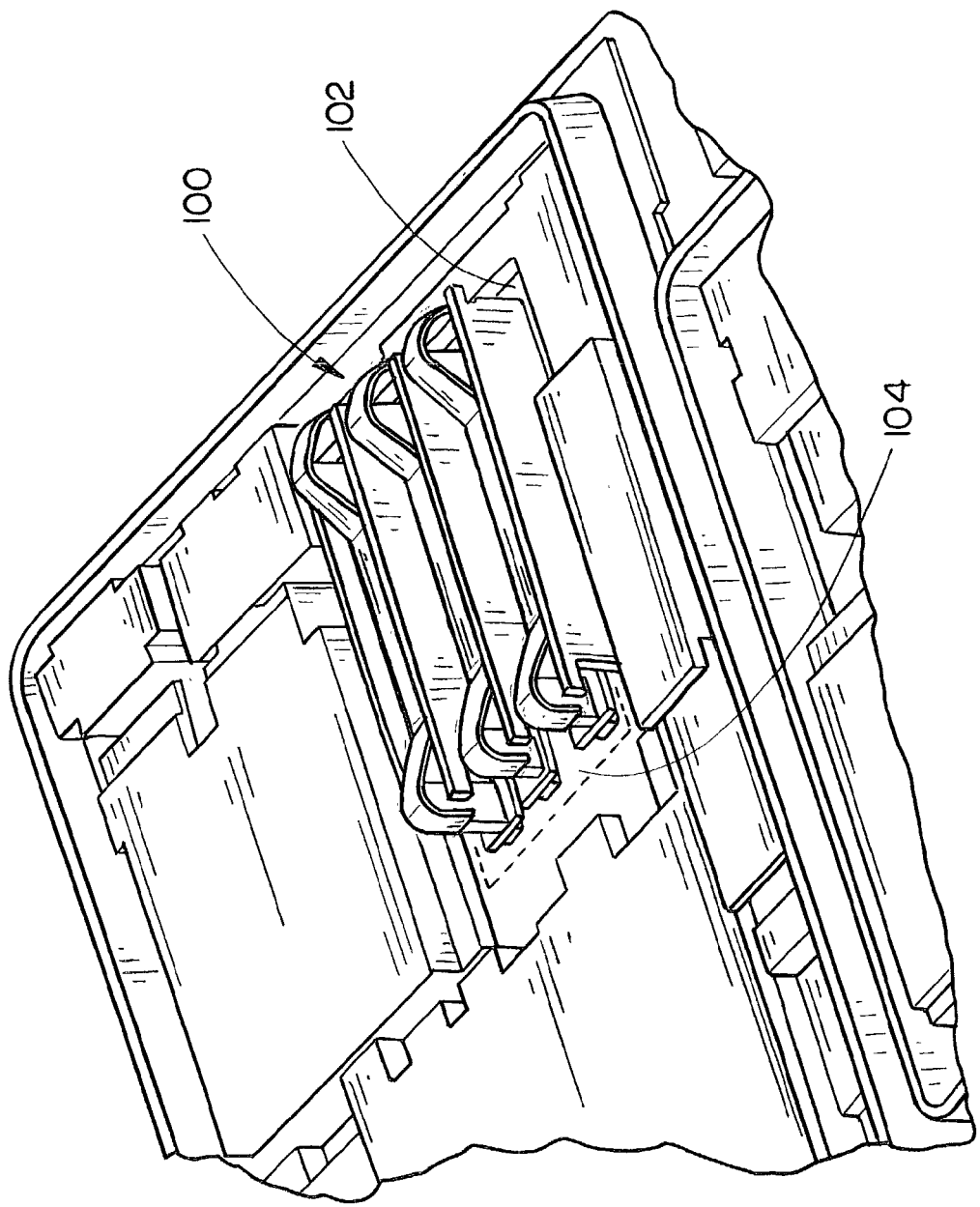
FIG. 1 is a perspective view illustrating a surface mounted SIM card reader in accordance with the prior art.
Figure 2:
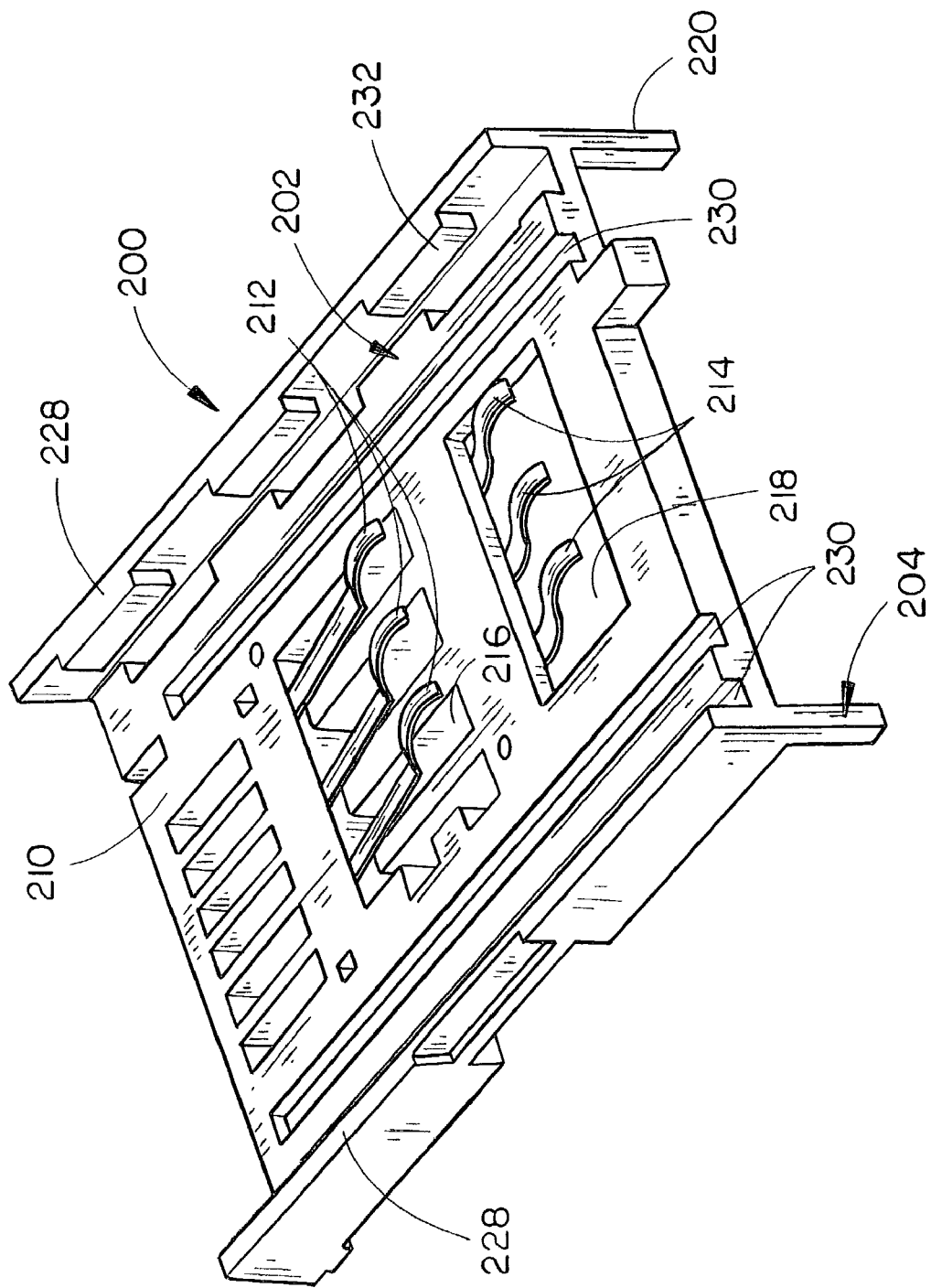
FIG. 2 is a perspective view illustrating an elevated data card reader in accordance with an exemplary embodiment of the present invention.
Figure 3:
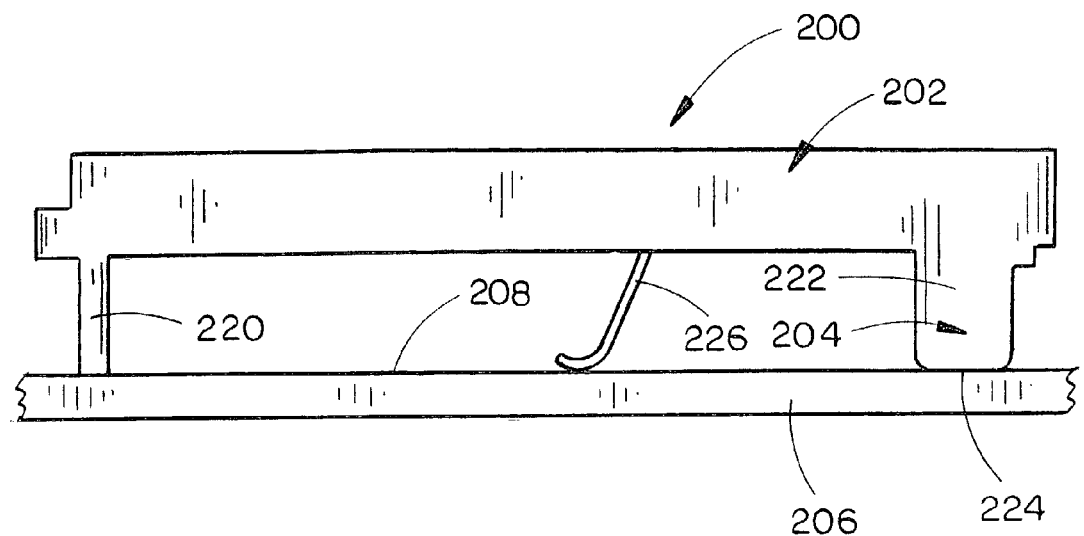
FIG. 3 is a side elevation view illustrating the data card reader shown in FIG. 2.
Figure 4:
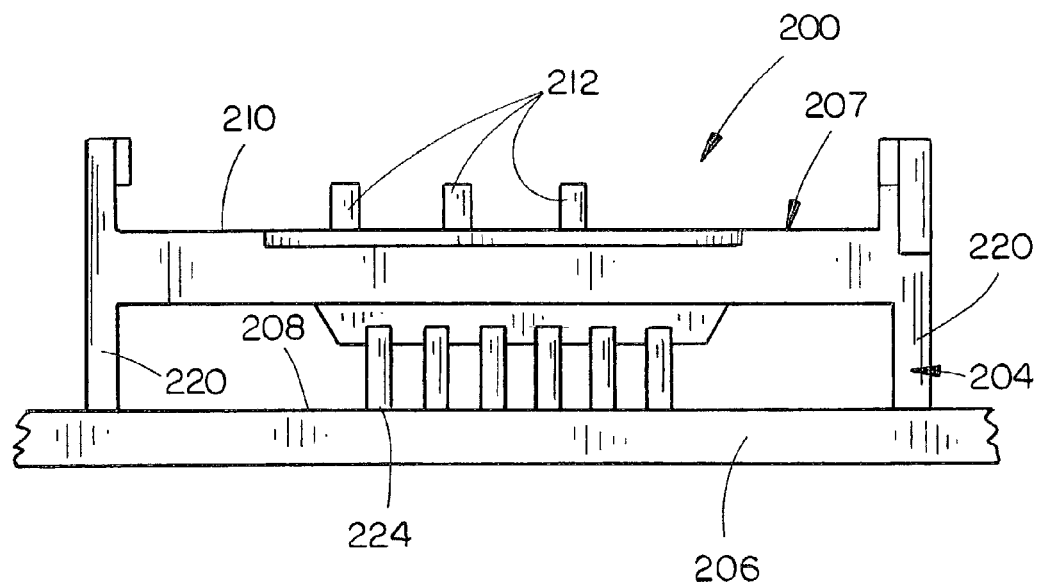
FIG. 4 is an end elevation view illustrating the data card reader shown in FIG. 2.

Referring generally to FIGS. 2 through 4, an exemplary data card reader in accordance with the present invention is described. The data card reader 200 includes a card receiving assembly 202 for receiving a data card such as a SIM card, UIM card, or the like, so that data may be read from or written to the card by the data card reader 200. A support assembly 204 attaches the card receiving assembly 202 to a circuit board 206, for example, the main printed circuit board (PCB) of an electronic device such as a mobile telephone, hand held (palmtop) computer, personal digital assistant (PDA), or the like. The support assembly 204 spaces the card receiving assembly 202 away from the circuit board 206 so that the card receiving assembly 202 is generally elevated from the surface 208 of the circuit board 206 to which the data card reader 200 is mounted. In this manner, one or more components may be mounted to the circuit board 206 beneath the card receiving assembly 202, thereby conserving board space (i.e., surface area of the circuit board 206). For example, in one embodiment, in which the card receiving assembly 202 is configured for receiving a SIM card, the elevated data card reader 200 occupies approximately 26.6 square millimeters of the surface of the circuit board 206 to which the reader 200 is mounted. Thus, the elevated data card reader requires approximately 49.25 square millimeters less surface area than comparable surface mounted data card readers of the prior art (e.g., the surface mounted SIM card reader 100 illustrated in FIG. 1).

In the embodiment shown in FIGS. 2 through 4, the card receiving assembly 202 includes a substantially flat, generally rectangular surface 210 having a length and width greater than the length and width of the data card to be received in the card receiving assembly 202. Electrical contacts 212 and 214 extend through apertures 216 and 218, respectively, formed in the surface 210. These electrical contacts 212 and 214 engage contact pads disposed on the surface of the data card when the data card is received in the card receiving assembly 202. Preferably, the electrical contacts 212 and 214 extend through the elevated data card reader 200 and are coupled (e.g., soldered, bonded using a conducting adhesive, or the like) to the circuit board 206, thereby providing electrical interconnection of the data card with the circuit board 206. In the embodiment illustrated in FIGS. 2 through 4, cantilevered spring electrical contacts 212 and 214 are illustrated. However, it is contemplated that other types of electrical contacts may be used depending on design preferences and the data card technology employed without departing from the scope and spirit of the invention.

The support assembly 204 includes one or more standoff posts 220 and 222 extending from the underside of the card receiving assembly 202 to the circuit board 206. The standoff posts 220 and 222 elevate or space the card receiving assembly 202 away from the circuit board 206. In this manner, the elevated data card reader 200 of the present invention allows board space beneath the card receiving assembly 202 to be used for other board level components.

In the embodiment shown in FIGS. 2 through 4, the support assembly 204 includes four standoff posts 220 and 222 extending from each corner of the card receiving assembly 202 to the circuit board 206. Preferably, two of these standoff posts 222 are widened with respect to the other posts 220 for strengthening the attachment of the card receiving portion 202 near the points 224 where electrical contacts 212 and 214 are coupled to the circuit board 206 to absorb stresses caused by insertion and removal of the data card (and/or the data card holder). However, it will be appreciated that the support assembly 204 is not limited to this configuration, and it is contemplated that the number of standoff posts employed by the elevated data card reader 200 may vary depending on design requirements of the particular application in which the data card reader 200 is used.

As shown in FIG. 3, a ground may be provided for electrically grounding the card receiving assembly 202 and/or a data card received therein to the circuit board 208. In the embodiment illustrated, the ground is comprised of a spring contact 226 extending from the card receiving assembly 202 to the circuit board 206. Grounding may also be provided through one or more of the posts 220 and 222 or via one or more of the electrical contacts 212 and 214 in addition to or as an alternate to grounding provided via the spring contact 226.

In FIGS. 2 through 4, the data card reader 200 illustrated comprises a Y-axis SIM card reader. In this embodiment, the data card (a SIM card) and/or a data card holder supporting the data card is slid into the card receiving assembly 202 along the Y-axis of the data card reader 200 (i.e., a plane generally parallel to the surface 210 of the card receiving assembly 202). The card receiving assembly 202 may further include structure suitable for engaging the data card (and/or the data card holder) when the data card is received in the card receiving assembly 202 for holding the data card against the surface 208 so that the electrical contacts 212 and 214 may engage corresponding contact pads formed on the data card. For example, in the embodiment shown, the card receiving assembly 202 may include generally parallel, opposed side walls 228 extending outwardly from the surface 210 of the card receiving assembly 202 for guiding and retaining the data card (and/or the data card holder) as the data card is inserted therein. Grooves 230, tabs 232, or the like may be formed in the surface 210 or side walls 228 of the card receiving assembly 202 for engaging the data card (and/or the data card holder) as it is inserted into the card receiving assembly 202 (see FIGS. 7 and 8).

While a Y-axis data card reader 200 is illustrated in FIGS. 2 through 4, the present invention is not limited to data card reader configurations employing Y-axis insertion of the data card (i.e., insertion along a plane generally parallel to the surface 210 of the card receiving assembly 202). For example, the data card reader 200 may comprise a card receiving assembly providing Z-axis insertion of the data card. In such embodiments, the data card (and/or a data card holder) supporting the data card is inserted into the card receiving assembly 202 along the Z-axis (i.e., along a plane generally perpendicular to the surface 210 of the card receiving assembly 202 (see FIGS. 9 and 10). Accordingly, structure such as side walls 226 and 228, grooves 230, and tabs 232 employed by the Y-axis data card reader 200 for engaging the data card (and/or the data card holder) inserted along the Y-axis may be removed or replaced by structure suitable for retaining a data card (and/or a data card holder) inserted along the Z-axis. Moreover, it is contemplated that the elevated data card reader 200 may be configured to receive data cards other than SIM cards (e.g., smart cards, UIM cards, and the like) without departing from the scope and spirit of the invention.

Figure 5:
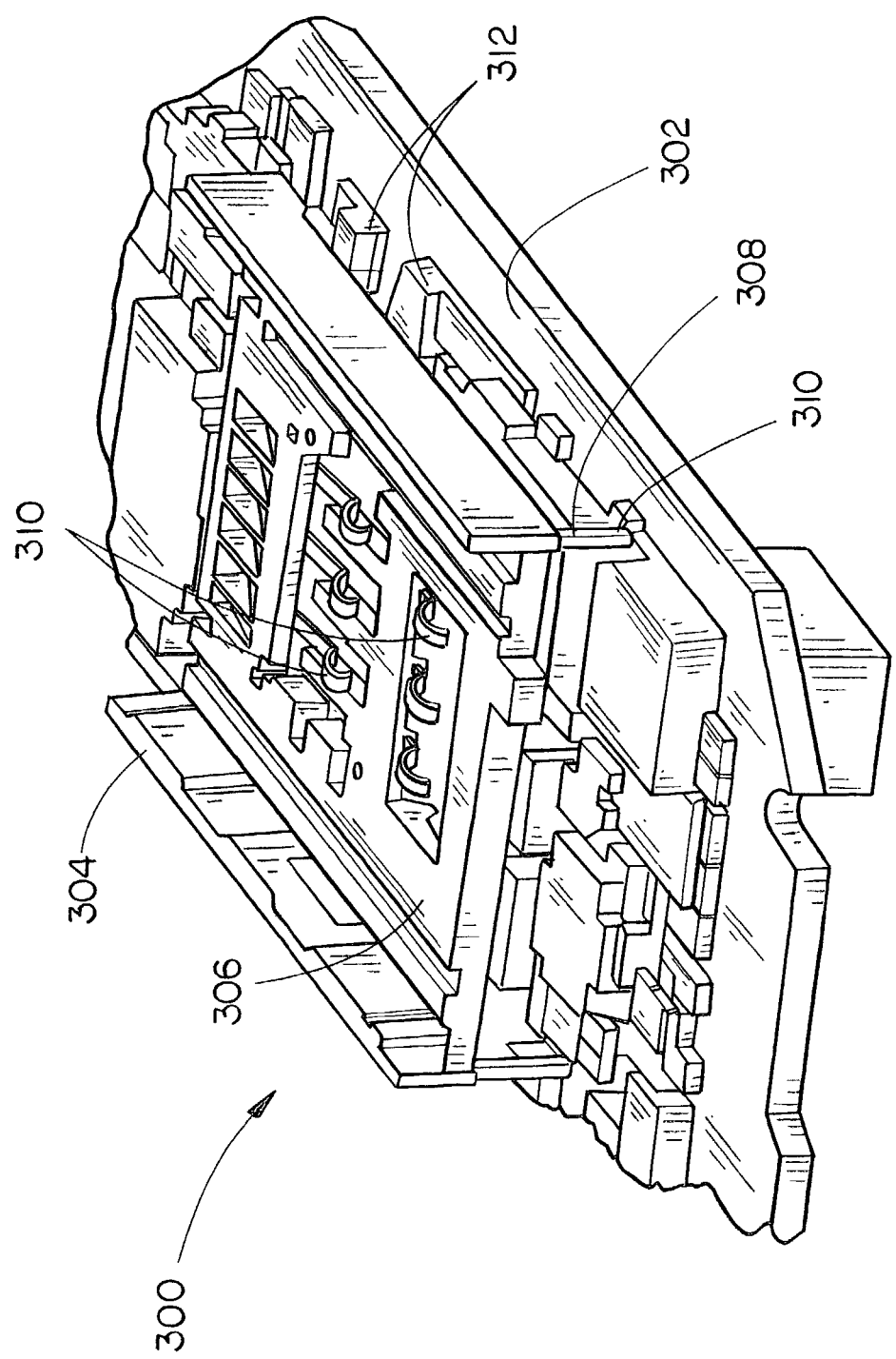
FIG. 5 is a perspective view illustrating the data card reader shown in FIG. 2 mounted to a circuit board.
Figure 6:
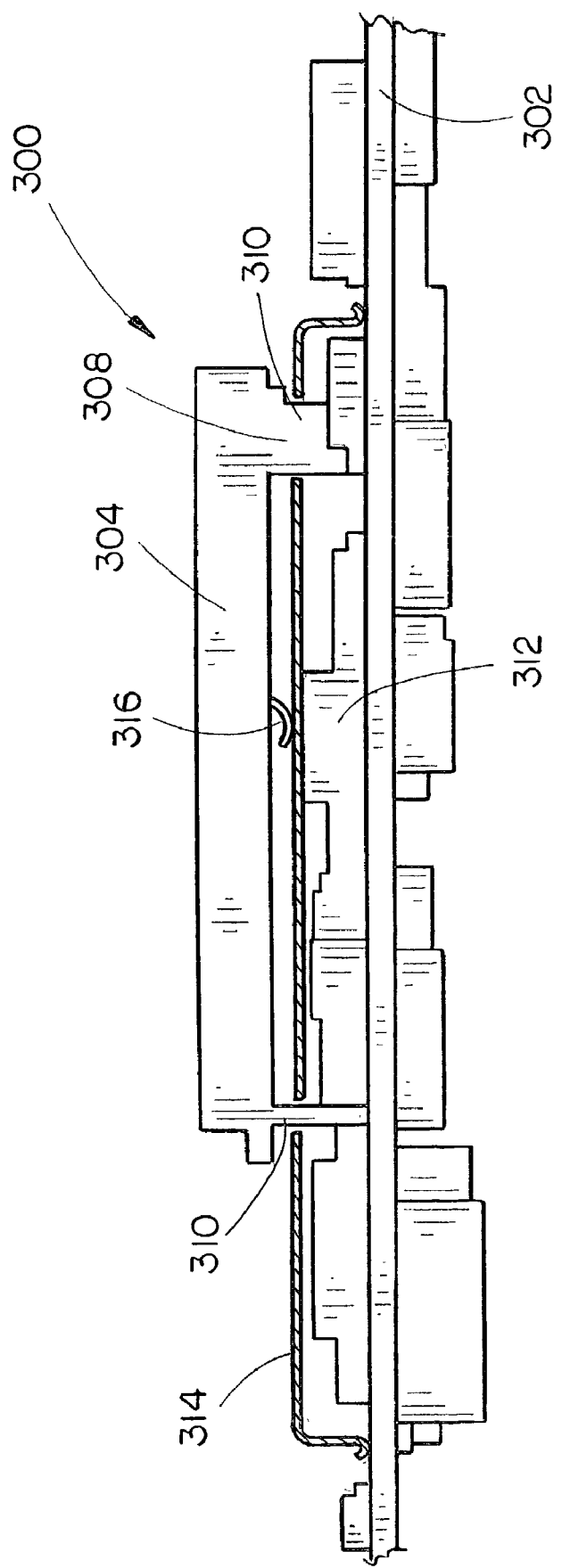
FIG. 6 is a side elevation view of the data card reader and circuit board shown in FIG. 5, wherein a shield is disposed between the data card and circuit board.

Referring now to FIGS. 5 and 6, an exemplary circuit board assembly employing an elevated data card reader in accordance with the present invention is described. The circuit board assembly 300 includes a circuit board 302 having an elevated data card reader 304 mounted thereto as described in the discussion of FIGS. 2 through 4. Like the data card reader 200 illustrated in FIGS. 2 through 4, the data card reader 304 shown in FIGS. 5 and 6 includes a card receiving assembly 306 and a support assembly 308. The support assembly 308 includes one or more standoff posts 310, which elevate the card receiving assembly 306 from the circuit board 302 so that one or more circuit board level components 312 may be positioned beneath the card receiving assembly 306.

As shown in FIG. 6, the data card reader 304 may further include a shield 314 disposed between the card receiving assembly 306 and any components 312 mounted to the circuit board 302 beneath the card receiving assembly 306 for shielding a data card received in the card receiving assembly 306 from those components 312. A ground may be provided for grounding the card receiving assembly 306 and the data card received therein to the circuit board 302. In the embodiment illustrated, this ground is comprised of a spring contact 316 extending from the card receiving assembly 306 to the shield 314. Grounding may also be provided via a spring contact extending between the card receiving assembly 306 and the circuit board 302, through one or more of the standoff posts 310, or via an electrical contact 318 of the card receiving assembly 306 in addition to or as an alternate grounding provided by the spring contact 316.

Figure 7:
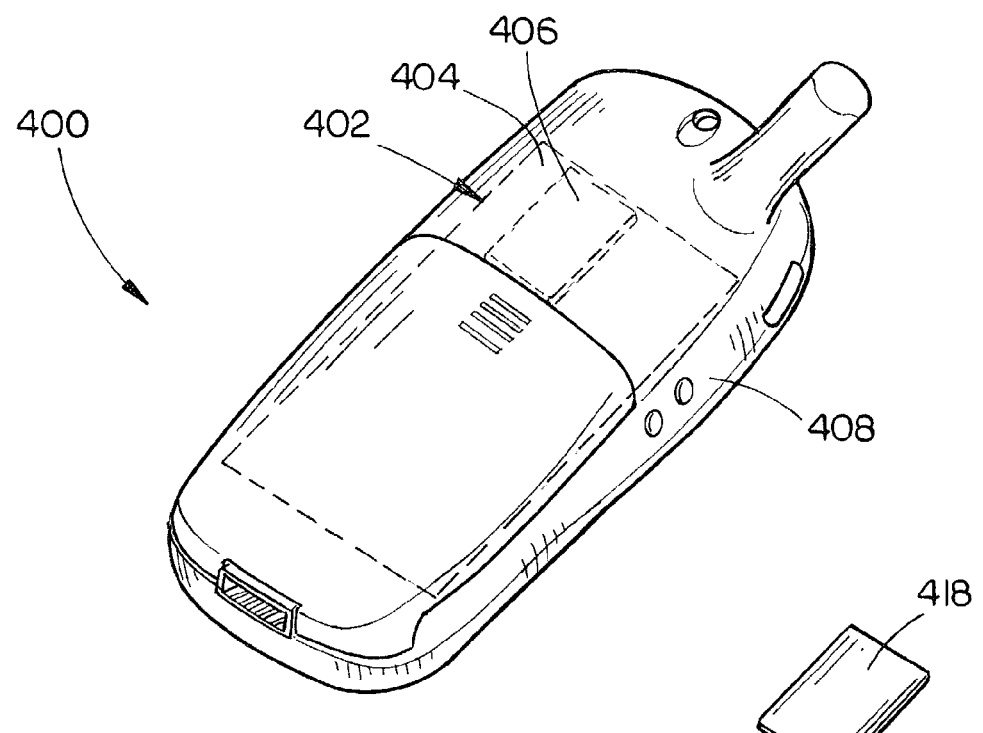
FIG. 7 is a perspective view illustrating an exemplary mobile telephone employing an elevated data card reader in accordance with the present invention wherein the data card reader is a Y-axis data card reader.
Figure 8:
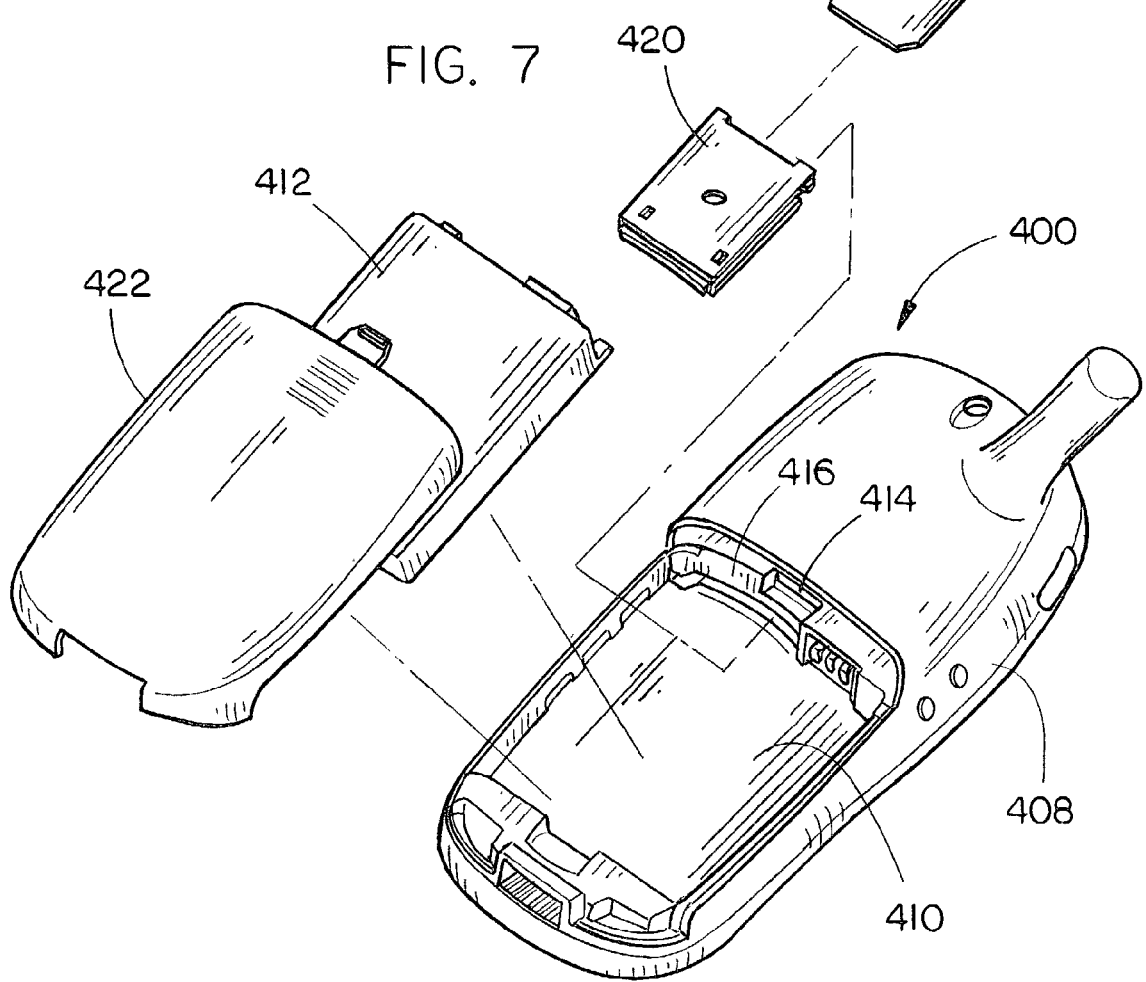
FIG. 8 is an exploded perspective view illustrating the mobile telephone shown in FIG. 7, further showing insertion of a data card into the data card reader.

Referring now to FIGS. 7 and 8, an exemplary mobile telephone employing an elevated data card reader in accordance with the present invention is described. The mobile telephone 400 includes a circuit board assembly 402 comprising a main printed circuit board (PCB) 404 having a Y-axis elevated data card reader 406 including a card receiving assembly and support assembly as described in the discussion of FIGS. 2 through 6. The circuit board assembly 402 is enclosed within the mobile telephone housing 408, which includes a compartment 410 enclosing a power source such as a rechargeable battery 412, or the like, providing a source of electrical power to the mobile telephone 400. As shown in FIGS. 7 and 8, an aperture or slot 414 is formed in a wall 416 of the battery compartment 410 providing access to the data card reader 406 for insertion of a data card 418 such as a SIM card, UIM card, or the like (a Y-axis SIM card reader and SIM card are illustrated).

In the embodiment illustrated in FIGS. 7 and 8, the mobile telephone 400 further includes a data card holder 420 that supports the data card during insertion and removal. During insertion, the data card 418 is first placed within the data card holder 420. Preferably, the data card 418 and data card holder 420 are configured so that insertion of the data card 418 into the data card holder 420 is intuitively obvious to the user. For example, as shown in FIG. 8, the data card 418 may have a shape (e.g., a data card 418 having a clipped corner is shown) preventing incorrect insertion into the data card holder 420. The data card holder 420, containing the data card 418, is then inserted through the slot 414 in the battery compartment wall 416 so that the data card holder 420 and data card 418 are slid into the card receiving assembly of the elevated data card reader 406 along the Y-axis of the reader 406. The battery 412 may then be placed in the battery compartment 410, and a battery compartment cover 422 placed over the battery compartment 410 to enclose the battery 412. During removal, the battery compartment cover 422 and battery are removed. The data card holder 420 is slid from the slot 414 in the battery compartment wall 416 along the Y-axis of the data card reader 406, whereupon the data card 418 may be removed from the data card holder 420.

Figure 9:
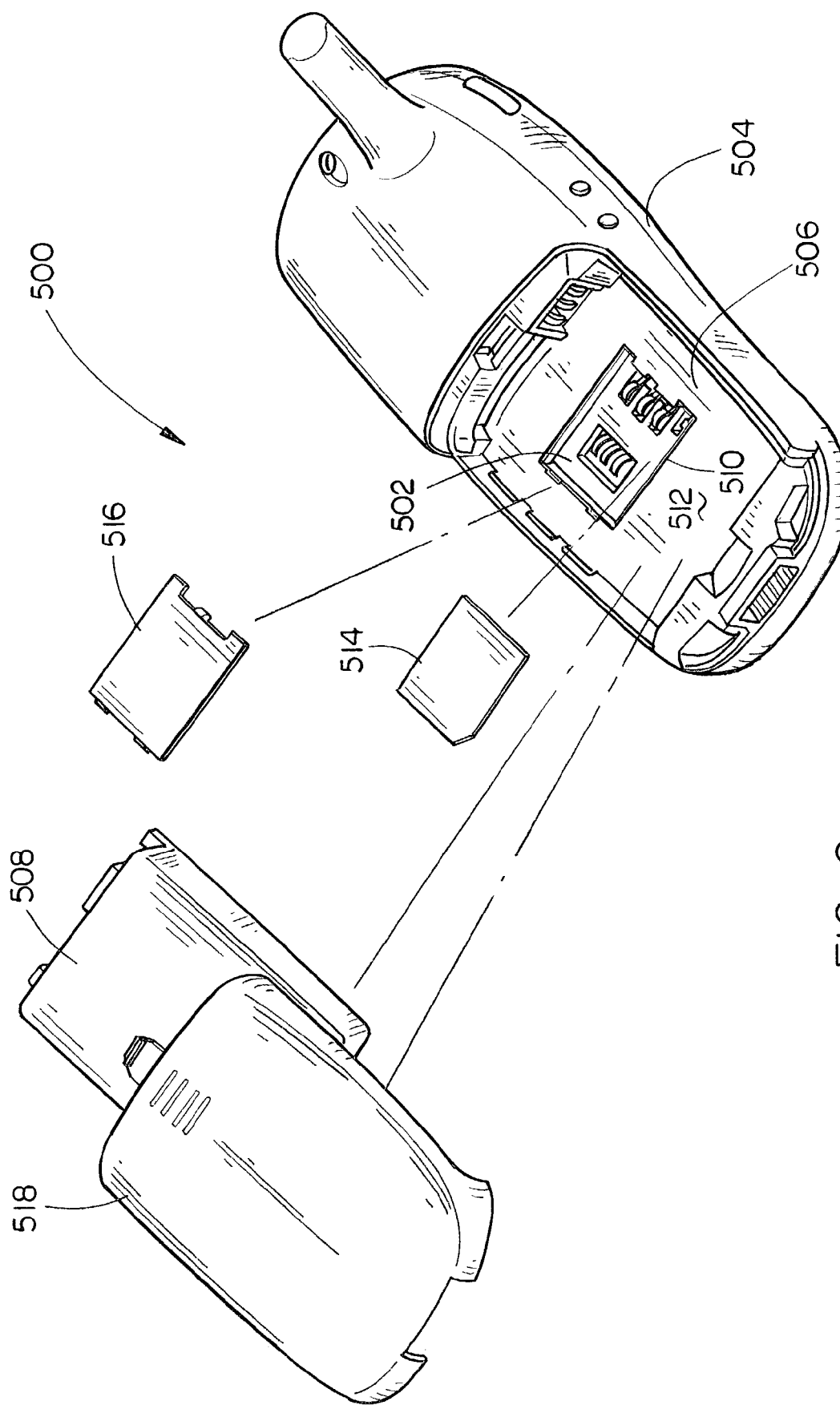
FIG. 9 is an exploded perspective view illustrating an exemplary mobile telephone employing an elevated data card reader in accordance with the present invention wherein the data card reader is a Z-axis data card reader.

Referring now to FIG. 9, an exemplary mobile telephone employing a Z-axis elevated data card reader in accordance with the present invention is described. The mobile telephone 500 includes a Z-axis elevated data card reader including a card receiving assembly and support assembly as described in the discussion of FIGS. 2 through 6. Like the mobile telephone 400 shown in FIGS. 7 and 8, the mobile telephone 500 shown in FIG. 9 includes a housing 504 having a compartment 506 enclosing a power source such as a rechargeable battery 508, or the like. An aperture 510 is formed in an interior wall 512 of the battery compartment 504 providing access to the data card reader 502 for insertion of a data card 514 such as a SIM card, UIM card, or the like (a Z-axis SIM card reader and SIM card are illustrated).

As shown in FIG. 9, the data card 514 is inserted into the data card reader 502 through the aperture 510 in the interior wall 512 of the battery compartment 506 along the Z-axis of the data card reader 502. Preferably, the data card reader 502 and data card 514 are configured so that insertion of the data card 514 into the data card reader 502 is intuitively obvious to the user. For example, the data card 514 may have a shape preventing incorrect insertion into the data card reader 514, or indicia may be provided indicating the correct orientation of the data card 514 for insertion in the data card reader 502. In embodiments of the invention, a cover plate 516 may be inserted within the aperture 510 over the data card reader 502 and data card 514. The cover plate 516 prevents the data card 514 from becoming dislodged from the data card reader 502 while the battery 508 and battery compartment cover 518 are removed from the battery compartment 504. Alternately, the data card 514 may be held in place by the battery 508 or the data card reader 502 itself.

In the embodiments shown in FIGS. 7 through 9, the elevated data card reader 406, 502 is accessed through the battery compartment 410, 506 of the mobile telephone 400, 500. However, it is contemplated that that elevated data card reader may be positioned so that access to the data card reader is provided from other points on the mobile telephone. For example, the data card reader may be positioned so that the data card is inserted into the data card reader, which may be either a Y-axis or Z-axis data card reader, directly through the housing in an area outside of the battery compartment. Alternately, a separate compartment may be formed in the housing of the mobile telephone for providing access to the data card reader.

In exemplary embodiments of the invention, the elevated data card reader may employ a pick-and-place design wherein the data card reader comprises a surface mounted part directly soldered or adhered to the circuit board to which it is mounted. In this manner, the elevated data card reader may be assembled to a circuit board such as the main PCB of a mobile telephone. The data card reader and circuit board may then be assembled into the housing of the mobile telephone as a single unit (e.g., circuit board assembly 300) so that the data card reader does not require assembly into the housing of the mobile telephone (or like electronic device) separately from the circuit board.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data card reader, comprising:
a card receiving assembly for receiving a data card;
an electrical connector for electrically coupling the data card to the circuit boat; and
a support assembly for mounting the card receiving assembly to a circuit board, the support assembly including at least one post far extending between the card receiving assembly and the circuit board for supporting the card receiving assembly, the at least one post including a first standoff cost and a second standoftpost, the second standoff post being widened with respect to the first standoff post for strengthenint the mounting of the card receiving assembly near the electrical connector to absorb stresses caused by insertion and removal of a data card in the card receiving assembly,
wherein the support assembly spaces the card receiving assembly away from the circuit board for allowing a component to be mounted to the circuit board beneath the card receiving assembly.

2. The data card reader as claimed in claim 1, further comprising a ground for grounding the data card reader.

3. The data card reader as claimed in claim 2, wherein the ground comprises a spring contact extending from the card receiving assembly to the circuit board.

4. The data card reader as claimed in claim 1, further comprising a shield far shielding the data card received in the card receiving assembly from components mounted to the circuit board beneath the card receiving assembly.

5. The data card reader as claimed in claim 4, further comprising a ground for grounding the card receiving assembly to the shield.

6. The data card reader as claimed in claim 5, wherein the ground comprises a spring contact extending from the card receiving assembly to the shield.

7. The data card reader as claimed in claim 1, further comprising a holder for holding a data card received in the card receiving assembly.

8. The data card reader as claimed in claim 1, wherein the data card comprises one of a SIM card and an UIM card.

9. A circuit board assembly, comprising:
a circuit board; and
a data card reader mounted to the circuit board, the data card reader including a card receiving assembly for receiving a data card, an electrical connector for electrically coupling the data card to the circuit board, and a support assembly including at least one post extending between the card receiving assembly and the circuit board for mounting the card receiving assembly to the circuit board, the at least one post including a first standoff post and a second standoff post, the second standoff post being widened with respect to the first standoff post for strengthening the mounting of the card receiving assembly near the electrical connector to absorb stresses caused by insertion and removal of a data card in the card receiving assembly,
wherein the support assembly spaces the card receiving assembly away from the circuit board for allowing a component to be mounted to the circuit board beneath the card receiving assembly.

10. The circuit board assembly as claimed in claim 9, wherein the data card reader further includes a ground for grounding the data card reader.

11. The circuit board assembly as claimed in claim 10, wherein the ground comprises a spring contact extending from the card receiving assembly to the circuit board.

12. The circuit board assembly as claimed in claim 9, further comprising a shield for shielding the data card received in the card receiving assembly from a component mounted to the circuit board beneath the card receiving assembly.

13. The circuit board assembly as claimed in claim 12, wherein the data card reader further includes a ground for grounding the card receiving assembly to the shield.

14. The circuit board assembly as claimed in claim 13, wherein the ground comprises a spring contact extending from the card receiving assembly to the shield.

15. The circuit board assembly as claimed in claim 9, further comprising a holder for holding a data card received in the card receiving assembly.

16. The circuit board assembly as claimed as claim 9, wherein the data card comprises one of a SIM card and an UIM card.

17. A mobile telephone, comprising:
a circuit board; and
a data card reader mounted to the circuit board, the data card reader including a card receiving assembly for receiving a data card, an electrical connector for electrically coupling the data card to the circuit board, and a post assembly for coupling the card receiving assembly to the circuit board, the post assembly including a first standoff post and a second standoff post, the second standoff post being widened with respect to the first standoff post for strengthening the mounting of the card receiving assembly near the electrical connector to absorb stresses caused by insertion and removal of a data card in the card receiving assembly,
wherein the post assembly spaces the card receiving assembly away from the circuit board for allowing a component to be mounted to the circuit board beneath the card receiving assembly.

18. The mobile telephone as claimed in claim 17, wherein the data card reader further includes a pound for grounding the data card reader.

19. The mobile telephone as claimed in claim 18, wherein the ground comprises a spring contact extending from the card receiving assembly to the circuit board.

20. The mobile telephone as claimed in claim 17, further comprising a shield for shielding the data card received in the card receiving assembly from components mounted to the circuit board beneath the card receiving assembly.

21. The mobile telephone as claimed in claim 20, wherein the data card reader further includes a ground for grounding the card receiving assembly to the shield.

22. The mobile telephone as claimed in claim 21, wherein the pound comprices a spring contact extending from the card receiving assembly to the shield.

23. The mobile telephone as claimed in claim 17, wherein the support assembly comprises at least one post extending between the card receiving assembly and the circuit board.

24. The mobile telephone as claimed in claim 17, further comprising a holder for holding a data card received in the card receiving assembly.

25. The mobile telephone as claimed as claim 17, wherein the data card comprises one of a SIM card and an UIM card.

26. A data card reader, comprising:
means for receiving a data card;
means for electrically coupling the data card to the circuit board; and means for mounting the data card receiving means to a circuit board, the mounting means including at least one post for extending between the card receiving assembly and the circuit board for supporting the card receiving assembly, the at least one post including a first standoff post and a second standoff post, the second standoff post beina widened with respect to the first standoff post for strengthening the mounting of the card receiving assembly near the electrical connector to absorb stresses caused by insertion and removal of a data card in the card receiving assembly, wherein the mounting means spaces the data card receiving means away from the circuit board for allowing a component to be mounted to the circuit board beneath the data card receiving means.

27. The data card reader as claimed in claim 26, further comprising means for shielding the data card from components mounted to the circuit board beneath the data card receiving means.

28. The data card reader as claimed in claim 26, further comprising means for grounding the data card to the circuit board.

29. The data card reader as claimed in claim 26, further comprising means for holding the data card received in the data card receiving means.

30. The data card reader as claimed as claim 26, wherein the data card comprises one of a SIM card and an UIM card.

* * * * *